United States Patent
Patten

[15] 3,645,623
[45] Feb. 29, 1972

[54] APPARATUS FOR MONITORING FILM THICKNESS BY REFLECTING A LIGHT BEAM FROM THE FILM SURFACE

[72] Inventor: Raymond A. Patten, 8612 Madison Place, Oxon Hill, Md. 20022

[22] Filed: Sept. 25, 1970

[21] Appl. No.: 75,520

[52] U.S. Cl. .............................356/1, 250/219 TH, 356/156
[51] Int. Cl. ............................G01b 11/06, G01b 11/14
[58] Field of Search ........................356/1, 156; 250/219 TH

[56] References Cited

UNITED STATES PATENTS 3,016,464  1/1962  Bailey............................356/156
3,017,512  1/1962  Wolbert......................250/219 TH UX Primary Examiner—Ronald L. Wibert
Assistant Examiner—Orville B. Chew, II
Attorney—R. S. Sciascia, Arthur L. Branning, J. G. Murray and M. L. Crane

[57] ABSTRACT

This disclosure is directed to a nondestructive test system which makes use of a reflected light beam to determine the thickness of a film deposited onto a substrate within a vacuum system. The thickness of the film is monitored during deposition without any deleterious effects on the film deposition. The system may likewise be used for relative position of one part with respect to another part.

10 Claims, 4 Drawing Figures

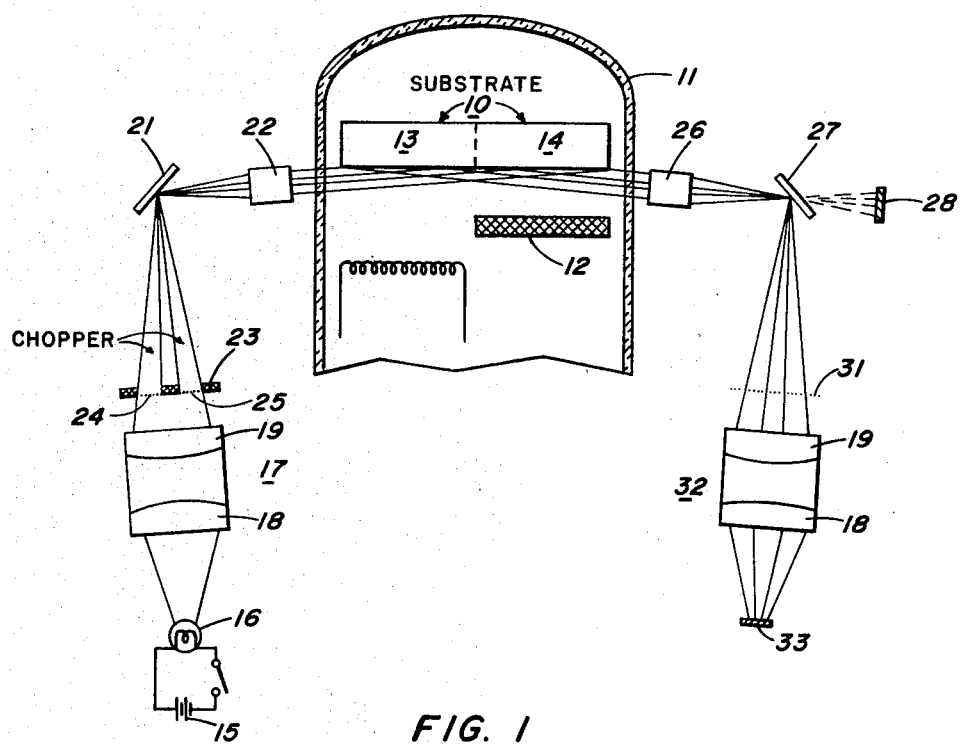
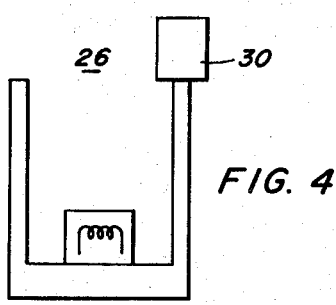
FIG. 4
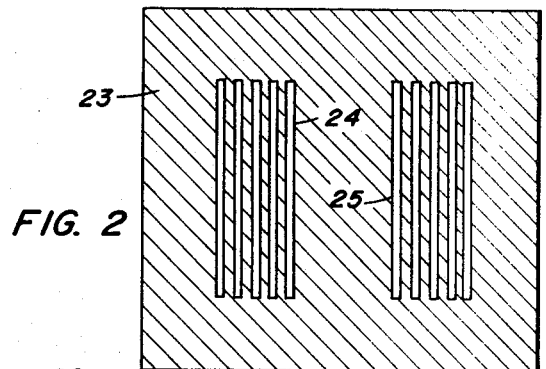
FIG. 2
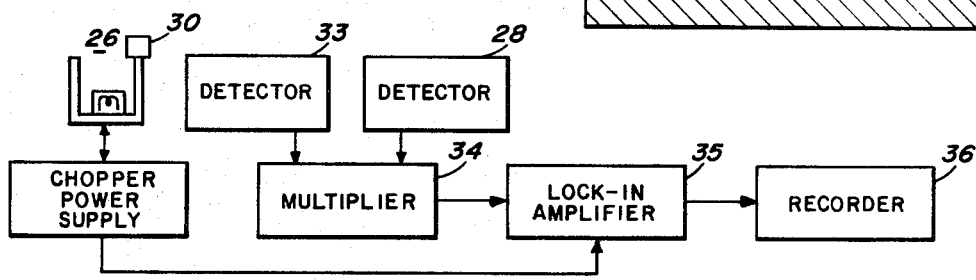
FIG. 3
INVENTOR.
RAYMOND A. PATTEN

APPARATUS FOR MONITORING FILM THICKNESS BY REFLECTING A LIGHT BEAM FROM THE FILM SURFACE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This system is directed to measurement of film thickness deposited onto a substrate and more particularly to a nondestructive system which measures the film thickness within a vacuum system while the film is being deposited.

Various methods have been used in the past to measure film thickness. Some of these measure the film within the vacuum system during deposition, others measure thickness after removal from the vacuum system. X-ray methods require the use of specialized equipment and a trained operator. Such a system depends on an accurate knowledge of the attenuation coefficient and generally are not usable as a continuous monitor of film thickness while it is growing.

Quartz crystal oscillators have been used. These systems continuously measure the film thickness; however, the film measured is the film deposited onto a portion of the quartz crystal and not the film deposited onto the substrate of interest which may be different.

Other systems such as interferometric methods, optical density techniques, and ellipsometry methods, which is an optical system, are accurate, nondestruct test systems; however, each have their drawbacks and limitations.

SUMMARY OF THE INVENTION

The system of this invention provides a nondestructive means of measuring the physical thickness of a film of materials deposited within a vacuum system. The system uses two distinct light beams which are formed by a grid and chopper and imaged onto separate halves of the substrate and reflected therefrom in parallel beams at an angle of 85.5°. The light reflected from the substrate is directed through a fixed grating by a suitable optical imaging system and directed onto a light detector. The light of each beam reflected by the substrate subtracted such that any difference will be proportional to the thickness of the film. Therefore, one-half of the substrate is masked such that the film is deposited onto only one-half of the substrate. As the film builds up, the light reflected by the side upon which the film is deposited will be moved laterally. Lateral movement of the light causes a displacement in the reflected light beam. Therefore, a portion of the displaced reflected light will be blocked by the fixed grating. Blocking of a portion of the light will produce a difference in the intensity of the two beams emerging from the grating and being detected. By subtracting the light intensity of one beam from the other, a resultant signal proportional to the film thickness is generated. Means is also provided to compensate for variations in source intensity and surface reflectivity.

STATEMENT OF THE OBJECTS

It is therefore an object of the invention to provide a system for measuring film thickness of a material deposited on a substrate within a vacuum system without the requirement of specialized equipment.

Another object is to be able to measure film thickness regardless of its electrical or optical properties.

Yet another object is to measure film thickness while compensating for variations in source intensity and surface reflectivity.

Still another object is to provide a system which senses the actual thickness of the film deposited onto a substrate.

While still another object is to provide a system which is simple in operation and may be operated by unskilled as well as skilled personnel.

BRIEF DESCRIPTION OF THE DRAWING

FIG. 1 is a diagrammatic view of the system.

FIG. 2 illustrates a grid through which separate beams of light are permitted to emerge to form two separate beams of light.

FIG. 3 illustrates a block diagram of an electrical circuit used in the detector system, and FIG. 4 illustrates a tuned fork used as a light chopper.

DESCRIPTION OF THE SYSTEM

Now referring to the drawing, there is shown by illustration a diagrammatic view illustrating the relative parts of the system for determining thickness of a film deposited onto a portion of a substrate. The substrate 10 is coated in any well known evacuated system such as a bell jar 11 shown in dotted line. Included within the bell jar is a mask 12 suitably positioned to prevent deposition of a film onto one-half of the substrate. Therefore, a film of a material is deposited onto only one-half 13 of the substrate with the other half 14 free from any coating. The halves are shown separated by a dotted line.

The system for measuring the thickness is shown entirely on the outside of the evacuated system, therefore, the vacuum system is not affected by the film-measuring system. The system includes a DC power source 15 that operates a light source 16 such as a 2-watt tungsten filament to provide a light beam which is directed through a condenser 17 formed of two 39 mm. diameter 63 mm. focal length achromats 18 and 19. The converging light emerging from the lens 19 forms an image of the filament of the light source at a mirror 21 which is located at the focal point of a lens 22 and so positioned to direct the light toward lens 22 and so positioned to direct the light toward lens 22 and the substrate 10. The light from the condenser 17 is directed toward a mask 23, shown in FIG. 2, which has two openings therein that divides the light beam into two separate beams. The mask includes the space grids 24 and 25 through which the light passes. The mask and grids and optical system are located such that converging light passing therethrough forms a reduced image at the midplane of the substrate. A light chopper 26 in the form of a tuning fork, tuned at 150 Hz., illustrated in FIG. 4, is positioned opposite the mask 23 and operative to alternately block one light beam and then the other beam by use of an attached shield 30. The light beam which is not blocked is reflected by mirror 21 through lens 22 onto the substrate. The light passing through grid 24 is optically directed onto and reflected by substrate half 13 while the light that passes through grid 25 is optically directed onto and reflected by substrate half 14. The light is directed from mirror 21 onto lens 22. Lens 22 is an $f/3.5$, 35 mm. focal length Cooke triplett from which the light emerges in a parallel beam. The light is directed onto the substrate such that without a film deposited thereon, the light will be reflected by the substrate at an angle of 85.5°. The light reflected by the substrate is incident on a lens 26 which is identical with lens 22, from which the light emerges in a convergent beam. The light from lens 26 is directed onto partially reflecting mirror 27 which permits a small portion of the light to pass therethrough. The light passing through mirror 27 is incident on a photodetector 28 such as silicon photodetectors. The light reflected by mirror 27 is directed through a fixed adjustable grid 31 onto a condenser 32 which is the same as the condenser 17. The light passing through the condenser 32 is incident on a photodetector 33 which converts the light into an electrical signal. The grids 24, 25, and 31 are 50 lines/inch Ronchi rulings.

Prior to deposition of a film, the system may be calibrated by operation of the detector system. Without any film deposited onto the substrate the output signal should be zero, since the intensity of the two beams should be the same and there is no difference which is required to obtain an output signal. In like manner, additional films could be applied to a surface which already has a film deposited thereon by adjusting the system at the beginning such that the output is zero. Subsequent thereto, deposition of a film onto the substrate will bring about a difference the same as if there had been no film deposited onto the substrate at the start. Since the system measures the light that passes through grid 31, the calibration may be carried out by adjusting the grid 31 horizontally until the intensity of the two light beams passing through the grid are equal as indicated by the output signal. Subsequently, any additional film deposited onto one-half of the substrate will displace one of the beams and the system will indicate the difference in the light intensity of the two beams passing through the grid 31. The system may also be calibrated electrically by adjusting the phase of the lock-in amplifier.

The light that passes through grid 31 is incident on a photodetector 33 which produces an electrical output signal corresponding to the intensity of the incident light. The electrical signal is directed into an electrical multiplier circuit 34 from which the output signal is directed into a lock-in amplifier 35. The signal from the lock-in amplifier is directed into a recorder or indicator which records or indicates the value of the output signal from the lock-in amplifier. The lock-in amplifier derives a signal from the chopper such that the lock-in amplifier is controlled by the frequency of the chopper. As such, a signal resulting from one light beam due to operation of the chopper will correspond with one phase of operation of the lock-in amplifier and the signal resulting from the other light beam due to operation of the chopper will correspond with the other phase of operation of the lock-in amplifier. The signal output produced by the lock-in amplifier is equal to the difference in the signals received during each half cycle of operation of phase change.

In some instances, variations may occur in source intensity and/or surface reflectivity, therefore, it may be necessary to provide means for compensating for such changes. The light detector 28 has been provided to detect the light passed by partially reflective mirror 27. The signal produced by detector 28 is suitably amplified and directed into the multiplier 34 where the signal from detector 28 is divided into the signal from detector 33 directed into the multiplier. The resultant signal from the multiplier is directed into the lock-in amplifier. Adjustment of the phase of the lock-in amplifier allows the signal of one light beam to be subtracted from a signal due to the other light beam whereby the resultant signal is directly proportional to the film thickness. The resultant signal of the lock-in amplifier provides a determination of film thickness whether or not the light detector 28 is provided.

Once the system is set up and ready for operation, detection of film thickness may be carried out as follows The film deposition means may be operated to start depositing a film onto the substrate. The light source, the chopper and associated electronic equipment are made operative to start detection of the film. The chopper vibrates to alternately block one light beam and then the next light beam that passes through grids 24 and 25. The light that passes through grid 24 is reflected by substrate half 13 (the half that is being coated) and the light passing through grid 25 is incident on substrate half 14, (the half not being coated). Each light beam is reflected by the respective substrate halves alternately onto lens 26 and onto partially reflective mirror 27. Part of the light passes through mirror 27 and is detected by light detector 28, the remainder of the light is reflected by mirror 27 through grid 31 and light condenser 32 onto light detector 33.

The light reflected by substrate half 13 upon which the film is being deposited will be displaced laterally an amount equal to the thickness of the film, therefore, the light beam will be displaced relative to the grid 31. Since the one light beam is displaced with respect to grid 31, less light in that beam will pass through the grid, consequently the light for that beam incident on the detector will be less than that prior to deposition of the film. The light beam incident on substrate half 14 will not be affected, therefore, the light beam that passes through grid 25 and grid 31 will not be affected and the intensity will be unchanged. The outputs from the photodetector 33 are directed into the lock-in amplifier where the signal from one beam is subtracted from the other. The resultant output signal from the lock-in amplifier is directly proportional to the film thickness.

It has been noted above that some of the light passes through partially reflective mirror 27 onto a photodetector 28. The signal output from photodetector 28 may be divided into the signals from detector 33 to normalize any variations in source intensity and surface reflectivity. The resultant signals are fed into the lock-in amplifier as set forth above for the signals from detector 33.

The film thickness measuring system has been shown on the outside of the vacuum deposition chamber, therefore, the walls of the chamber or "window" in the area through which the light passes should be such that the wall does not interfere optically with the light that passes therethrough. To avoid any optical interference with the light due to passing through the windows in the vacuum chamber, the lenses 22 and 26 may be formed in the chamber wall and properly aligned to direct light onto the substrate and receive the light reflected from the substrate in the manner described above.

The system has been shown with mirrors 21 and 27 which fold the light in an optical path. Such a system could be placed within the vacuum chamber so that the light need not pass through the walls of the vacuum chamber. The system could be built without the mirrors 21 and 27 positioned as they are. The requirement is that the parallel rays of light be incident on the two sections of the substrate and reflected into an optical system that detects the light.

The system has been described using a single substrate upon which a film is to be deposited. The system could be used with two separate surfaces positioned side by side with their surfaces in parallelism where one light beam is directed onto one surface and the other light beam is directed onto the other surface. Such an arrangement may be used not only to measure deposition of a film onto one surface but may be used to measure relative movement of one surface with respect to the other surface.

In addition to the above, the system may be used to measure pressure. Pressure measurement may be made by having a fixed surface and a movable surface which moves laterally with respect to the fixed surface due to pressure on the one surface.

In any of the above-described systems, the surfaces upon which the two separate light beams are incident need not be exactly on the same level. Differences of level may be taken into account optically by adjustment of the grid 31 which permits the light to pass therethrough to the detector 33 or electronically by changing the phase of the lock-in amplifier.

Thus, it is seen that the above-described system may be used for monitoring film thickness, single or multiple, for determining relative movement of two surfaces or for determining pressure in a structure which has a moveable head.

Obviously many modifications and variations of the present invention are possible on the light of the above teachings. It is therefore to be understood that within the scope of the appended claims the invention may be practiced otherwise than as specifically described.

What is claimed and desired to be secured by Letters Patent of the United States is:

1. A monitor for determining the position of a first surface relative to a second surface, which comprises:
    first and second optical lenses positioned in optical alignment with each of said surfaces,
    said first lens so positioned and operative to direct parallel rays of light onto each of said surfaces,
    said second lens so positioned and operative to receive parallel rays of light reflected by each of said surfaces,
    means in optical alignment with said first lens operative to alternately direct first and second separate light beams through said first lens with said first beam directed onto said first surface and said second beam directed onto said second surface,
    a first light detector means,
    grid means in optical alignment with said second lens, said grid means adjustable relative to said light beams to restrict passage of said beams through said grid to said first detector means,
a lock-in amplifier means,
said light detector alternately directing an output signal into said lock-in amplifier in accordance with the intensity of said first and second light beams received thereby,
said lock-in amplifier producing an output signal representing any difference in the light intensity of said first and second light beams, and
means for receiving said output signal from said lock-in amplifier and indicating a measure of said output signal which is proportional to the relative positions of said two surfaces.

2. A monitor as claimed in claim 1 which comprises:
a light chopper means for alternately blocking said first and second light beams.

3. A monitor as claimed in claim 2 in which:
said light chopper is synchronized with said lock-in amplifier.

4. A monitor as claimed in claim 3 which includes:
a reflective mirror to reflect said first and second light beams onto said first lens and
a second light detector,
a partially reflective mirror for transmitting a portion of said reflected light beams onto said second light detector and reflecting the remaining light through said grid means in optical alignment with said second lens.

5. A monitor as claimed in claim 4 which includes:
a light mask,
said light mask including a pair of grids therein through which light passes,
said mask operative to form said first and second beams of light.

6. A monitor as claimed in claim 5 in which:
said first light beam is directed onto and reflected by said first surface and
said second light beam is directed onto and reflected by said second surface.

7. A monitor as claimed in claim 6 which includes:
a multiplier circuit,
said first and said second light detectors directing their output signals into said multiplier circuit,
said multiplier circuit dividing said signal from said second detector into the signal from said first detector, and
said multiplier circuit directing its output signal into said lock-in amplifier.

8. A monitor as claimed in claim 1 wherein:
said first and second surfaces are formed by a single substrate, whereby
said monitor determines the thickness of a film deposited onto said first surface portion of said substrate during deposition of a film thereon.

9. A monitor as claimed in claim 1 wherein:
said first surface is a movable head of a pressure device and said second surface is fixed relative to said movable head with their surfaces in parallelism whereby
said monitor determines pressure by measuring any movement of said movable head.

10. A monitor as claimed in claim 1 wherein:
said first and second surfaces are separate side-by-side surfaces with their surfaces in parallelism, whereby
said monitor determines the relative movement of said first surface relative to said second surface.

* * * * *